US012033771B2

(12) United States Patent
Kojima et al.

(10) Patent No.: US 12,033,771 B2
(45) Date of Patent: Jul. 9, 2024

(54) SHIELDED FLAT CABLE

(71) Applicant: SUMITOMO ELECTRIC INDUSTRIES, LTD., Osaka (JP)

(72) Inventors: Chiaki Kojima, Tochigi (JP); Yuki Mori, Tochigi (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/002,343

(22) PCT Filed: Jul. 2, 2020

(86) PCT No.: PCT/JP2020/025976
§ 371 (c)(1),
(2) Date: Dec. 19, 2022

(87) PCT Pub. No.: WO2022/003895
PCT Pub. Date: Jan. 6, 2022

(65) Prior Publication Data
US 2023/0230721 A1 Jul. 20, 2023

(51) Int. Cl.
*H01B 7/08* (2006.01)
*H01B 7/295* (2006.01)

(52) U.S. Cl.
CPC ......... *H01B 7/0861* (2013.01); *H01B 7/0823* (2013.01); *H01B 7/0838* (2013.01); *H01B 7/295* (2013.01)

(58) Field of Classification Search
CPC .......... H01B 7/02; H01B 7/0216; H01B 7/04; H01B 7/06; H01B 7/08; H01B 7/0823;
(Continued)

(56) References Cited

U.S. PATENT DOCUMENTS 3,582,532 A * 6/1971 Plummer ............. H02G 3/0487
174/DIG. 11
3,757,029 A * 9/1973 Marshall .................. H01B 7/08
174/117 FF
(Continued)

FOREIGN PATENT DOCUMENTS

JP 2009-238722 10/2009
JP 2010-165559 7/2010
(Continued)

*Primary Examiner* — William H. Mayo, III
(74) *Attorney, Agent, or Firm* — IPUSA, PLLC

(57) ABSTRACT

A shielded flat cable includes multiple conductors arrayed in parallel along a first plane, a resin insulating layer including first and second resin insulating layers that cover the conductors, the first plane being sandwiched between the first and second resin insulating layers, a shield layer that covers an outer surface of the resin insulating layer and that includes an adhesive, and a pair of flame-retardant resin films that cover an outer surface of the shield layer. The pair of resin films have a first bonding section and a second bonding section where the pair of resin films are bonded to each other. The outer surface of the shield layer has a first portion that contacts the first bonding section and a second portion that contacts the second bonding section. The shield layer has a third bonding section where the adhesive is bonded to each other.

12 Claims, 9 Drawing Sheets

(58) Field of Classification Search
CPC ...... H01B 7/0838; H01B 7/0861; H01B 7/18; H01B 7/295; H01B 11/02; H01B 11/04; H01B 11/06; H01B 13/016
USPC ........... 174/110 R, 113 R, 115, 117 R, 117 F, 174/117 FF
See application file for complete search history.

(56) References Cited

U.S. PATENT DOCUMENTS

| | | | | | |
|---|---|---|---|---|---|
| 4,287,385 | A * | 9/1981 | Dombrowsky | H01B 7/0838 | 174/105 R |
| 4,409,427 | A * | 10/1983 | Plummer, III | H01B 11/10 | 174/DIG. 11 |
| 4,475,006 | A * | 10/1984 | Olyphant, Jr. | H01B 7/0861 | 174/105 R |
| 4,566,745 | A * | 1/1986 | Maros | H01R 13/6581 | 439/98 |
| 5,003,126 | A * | 3/1991 | Fujii | G02B 6/4403 | 174/117 FF |
| 2019/0371494 | A1* | 12/2019 | Kojima | H01B 7/0838 | |
| 2021/0090761 | A1 | 3/2021 | Kojima et al. | | |

FOREIGN PATENT DOCUMENTS

| | | | |
|---|---|---|---|
| JP | 2010-165561 | 7/2010 | |
| JP | 2011-198687 | 10/2011 | |
| JP | WO 2018/159489 A1 * | 9/2018 | H01B 7/08 |
| WO | 2018/159489 | 9/2018 | |

* cited by examiner

500

SHIELDED FLAT CABLE

TECHNICAL FIELD

The present disclosure relates to a shielded flat cable.

BACKGROUND ART

Patent Document 1 discloses a flat cable, in which multiple conductors are arrayed in parallel and resin insulating films are laminated on the both side of the conductors, that includes a connection terminal, and at least one end of which is connected to an electrical connector. On the resin insulation film, a metal foil film for shielding is arranged with its metal surface facing outward, and the metal foil film is covered with a protective resin film except for a ground connecting part that connects to ground.

RELATED ART DOCUMENTS

Patent Documents

[Patent Document 1] Japanese Unexamined Patent Application Publication No. 2011-198687

SUMMARY OF THE INVENTION

A shielded flat cable of the present disclosure includes multiple conductors arrayed together in parallel along a first plane, a resin insulating layer that sandwiches the first plane and that covers the conductors, a shield layer that covers an outer surface of the resin insulating layer and that includes an adhesive, and a pair of flame-retardant resin films that cover an outer surface of the shield layer. The pair of resin films have a first bonding section and a second bonding section where the pair of resin films are bonded to each other. The outer surface of the shield layer has a first portion that contacts the first bonding section and a second portion that contacts the second bonding section. The shield layer has a third bonding section where the adhesive is bonded to each other.

EMBODIMENT FOR CARRYING OUT THE INVENTION

Figure 1:
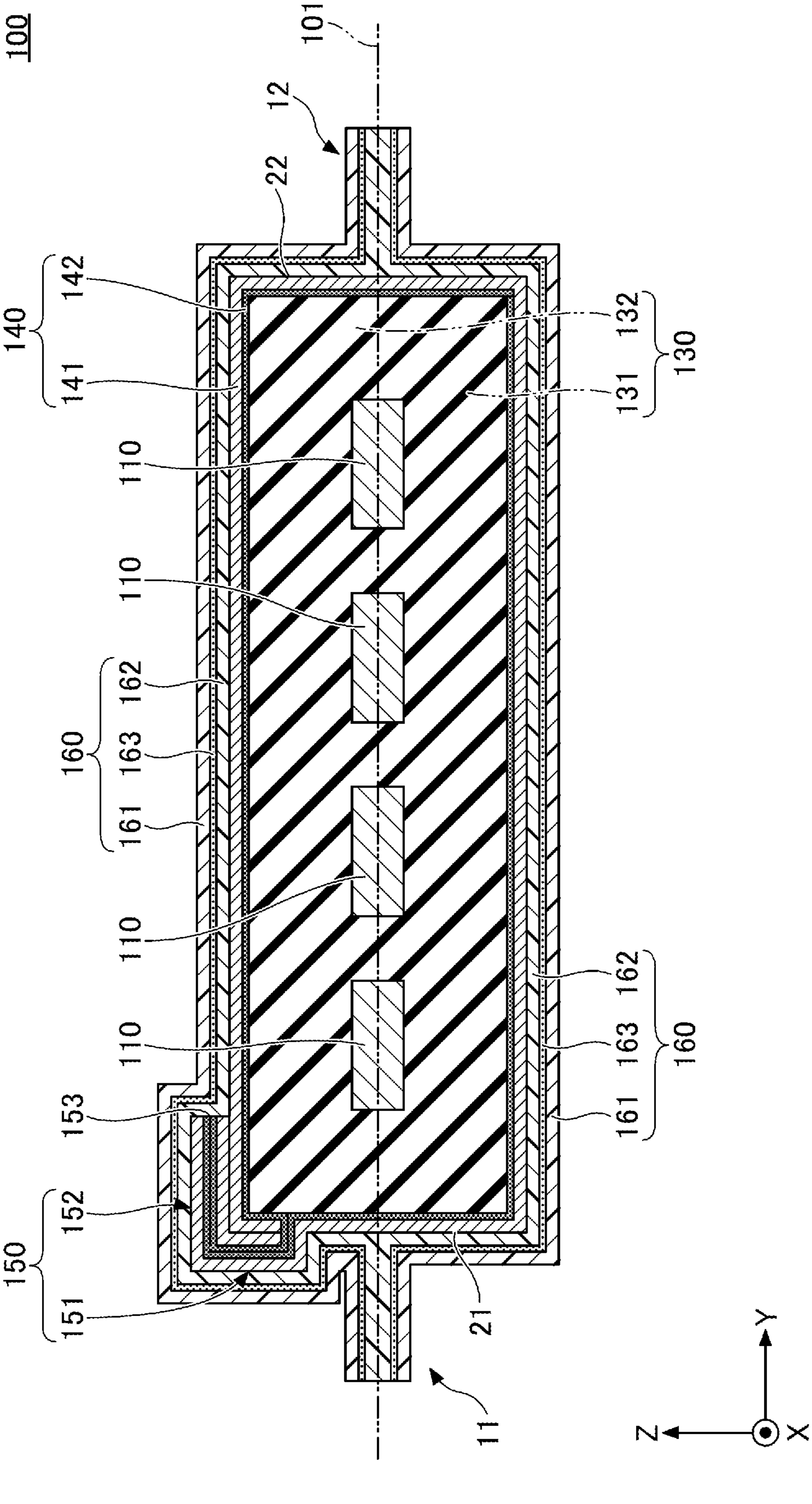
FIG. 1 is a cross-sectional view illustrating a shielded flat cable according to a first embodiment.

Problems to be Solved by the Present Disclosure

It is desired to improve the flame retardancy of a shielded flat cable used for transmission of high-frequency signals.

Effect of the Present Disclosure

According to the present disclosure, the flame retardancy of the shielded flat cable can be improved.

Embodiments will be described below.

Description of Embodiments of the Present Disclosure

The embodiments of the present disclosure are first listed and described. In the following description, the same or corresponding elements are referenced by the same sign and the same description is not repeated for them.

[1] The shielded flat cable according to one aspect of the present disclosure includes a plurality of conductors arrayed together in parallel along a first plane, a resin insulating layer including a first resin insulating layer and a second insulating layer, the first plane being sandwiched between the first resin insulating layer and the second insulating layer, and the first resin insulating layer and the second insulating layer covering the plurality of conductors, a shield layer that covers an outer surface of the resin insulating layer and that includes an adhesive, and a pair of flame-retardant resin films that cover an outer surface of the shield layer. The pair of resin films have a first bonding section and a second bonding section where the pair of resin films are bonded to each other. The outer surface of the shield layer has a first portion that contacts the first bonding section and a second portion that contacts the second bonding section. The shield layer has a third bonding section where the adhesive is bonded to each other.

In the shielded flat cable according to one aspect of the present disclosure, there is a risk that flames may enter the first bonding section and second bonding section, but because the first portion of the shielded film is in contact with the first bonding section and the second portion of the shielded film is in contact with the second bonding section, even if flames enter, the sealed state of the shield layer is maintained. Therefore, the resin insulating layer is protected by the shield layer and excellent flame retardancy is obtained.

[2] In the above aspect [1], the end of the third bonding section may be separated from the first bonding section and the second bonding section. In this case, better flame retardancy is obtained.

[3] In the above aspect [1] or the above aspect [2], the third bonding section may have a first portion extending in a first direction perpendicular to the first plane and a second portion that is connected to the first portion and that extends toward another end of the resin insulating layer in a second direction in which the plurality of conductors are arrayed in parallel. In this case, better flame retardancy is obtained.

[4] In the above aspect [3], an end of the third bonding section may be positioned to overlap the resin insulating layer in the first direction. In this case, better flame retardancy is obtained.

[5] In the above aspect [1] to the above aspect [4], the third bonding section may have a multi-folded section folded at a side of one end of the resin insulating layer in a second direction in which the plurality of conductors are arrayed in parallel. In this case, better flame retardancy is obtained.

[6] In the above aspect [1] to the above aspect [5], the shield layer is a pair of the shield layers that respectively cover the upper and lower surfaces of the resin insulating layer, and the adhesive of one shield layer and the adhesive of another shield layer may be bonded at the third bonding section. In this case, processing of the shield layer is easy.

[7] A shielded flat cable according to another aspect of the present disclosure includes a plurality of conductors arrayed together in parallel along a first plane, a resin insulating layer including a first resin insulating layer and a second insulating layer, the first plane being sandwiched between the first resin insulating layer and the second insulating layer, and the first resin insulating layer and the second insulating layer covering the plurality of conductors, a shield layer that covers an outer surface of the resin insulating layer and that includes an adhesive, and a pair of flame-retardant resin films that cover an outer surface of the shield layer. The pair of resin films have a first bonding section and a second bonding section where the pair of resin films are bonded to each other. The outer surface of the shield layer has a first portion that contacts the first bonding section and a second portion that contacts the second bonding section. The shield layer has a third portion that covers one surface of the resin insulating layer that is parallel to the first plane and that reaches the first portion, and a fourth portion that covers the one surface of the resin insulating layer from above the third portion.

According to the shielded flat cable according to another aspect of the present disclosure, excellent flame retardancy is obtained. Additionally, processing of the shield layer is easy.

[8] In the above aspect [7], the shield layer is a pair of the shield layers that respectively cover the upper and lower surfaces of the resin insulating layer, and the third portion may be included in one layer of the shield layers and the fourth portion may be included in another layer of the shield layers. In this case, processing of the shield layer is easy.

[9] In the above aspect [1] to the above aspect [8], the shield layer may be disposed between the first bonding section and second bonding section in a second direction in which the plurality of conductors are arrayed in parallel. In this case, it is easy to dispose the pair of resin films to cover the outer surface of the shield layer.

[10] A shielded flat cable according to another aspect of the present disclosure includes a plurality of conductors arrayed together in parallel along a first plane, a resin insulating layer including a first resin insulating layer and a second insulating layer, the first plane being sandwiched between the first resin insulating layer and the second insulating layer, and the first resin insulating layer and the second insulating layer covering the plurality of conductors, and a shield layer that covers an outer surface of the resin insulating layer and that includes an adhesive and a flame-retardant resin film. The shield layer has a second plane and a third plane opposite to the second plane. The adhesive is provided on the second plane, the resin film is provided on the third plane, and the adhesive is disposed closer to the resin insulating layer than the resin film is. The shield layer has a fifth portion that covers at least a portion of one surface of the resin insulating layer, the one surface being parallel to the first plane, and a sixth portion that covers the one surface of the resin insulating layer from above the fifth portion.

[11] In the above aspect [10], the fifth portion may reach one end of the resin insulating layer in the second direction in which the plurality of conductors are arrayed in parallel. In this case, processing of the shield layer is easy.

[12] In the above aspect [10] or the above aspect [11], the shield layer is a pair of the shield layers that respectively cover the upper and lower surfaces of the resin insulating layer, and the fifth portion may be included in one layer of the shield layers and the sixth portion may be included in another layer of the shield layers. In this case, processing of the shield layer is easy.

DETAILS OF EMBODIMENTS OF THE PRESENT DISCLOSURE

The embodiments of the present disclosure will be described in detail below, but the embodiments are not limited to these. In this specification and drawings, components having substantially the same functional configuration may be referenced by the same sign, and duplicate description may be omitted. In each drawing, an XYZ orthogonal coordinate system is set for convenience of description.

First Embodiment

A first embodiment will be described. The first embodiment relates to a shielded flat cable. FIG. 1 is a cross-sectional view illustrating a shielded flat cable according to the first embodiment. FIG. 1 illustrates a cross section of the shielded flat cable in a direction perpendicular to a longitudinal direction.

A shielded flat cable 100 according to the first embodiment is a cable used for electrically connecting devices or for wiring in a device. As illustrated in FIG. 1, the shielded flat cable 100 includes multiple (here, four) conductors 110 arranged along a first plane 101 parallel to the XY plane. The multiple conductors 110 are arranged in a plane. The multiple conductors 110 extend in the X-axis direction and are arrayed in parallel in the Y-axis direction, for example. The X-axis direction is the longitudinal direction of the shielded flat cable 100 and the Y-axis direction is the width direction of the shielded flat cable 100. The conductor 110 is, for example, a conductor having a rectangular cross section and is made of metal such as copper foil or tin-plated soft copper foil. The conductor 110 is formed in a nearly flat rectangular shape in the YZ cross section. The number of the conductors 110 included in the shielded flat cable 100 according to the first embodiment is four, but the number of the conductors 110 can be suitably determined. A direction in which multiple conductors 110 are arrayed in parallel, i.e., the Y-axis direction, is an example of a second direction.

The shielded flat cable 100 includes a resin insulating layer 130 that sandwiches the first plane 101 and that covers the multiple conductors 110. For example, the resin insulating layer 130 includes a first resin insulating layer 131 on the −Z side of the first plane 101 and a second resin insulating layer 132 on the +Z side of the first plane 101. The resin insulating layer 130 is a layer for securing the dielectric strength and high-frequency characteristics of the shielded flat cable 100, and is made of a resin such as polyethylene, polypropylene, polyimide, polyethylene terephthalate, polyester, polyphenylene sulfide, or the like.

The shielded flat cable 100 includes a shield layer with adhesive 140 that covers the outer surface of the resin insulating layer 130. The shield layer with adhesive 140 includes a shield layer 141 and an anchor coating layer 142. The shield layer 141 is a layer having a shielding function to counteract noise and secure high-frequency characteristics of the shielded flat cable 100, and is made of, for example, a metal foil of copper foil or aluminum foil. The anchor coating layer 142 is provided between the resin insulating layer 130 and the shield layer 141 to bond the resin insulating layer 130 and the shield layer 141. The material of the anchor coating layer 142 is not limited. For example, as the material for the anchor coating layer 142, a urethane-based anchor coating material, which is a mixture of polyurethane as the main agent and an isocyanate-based curing agent, can be used. The anchor coating layer 142 is an example of an adhesive.

The shield layer with adhesive 140 is arranged such that the anchor coating layer 142 touches the outer surface of the resin insulating layer 130 (a surface opposite to the surfaces of the first resin insulating layer 131 and the second resin insulating layer 132 bonded to the conductor 110). The shield layer with adhesive 140 continuously surrounds the outer surface of the resin insulating layer 130 and has a third bonding section 150 where the anchor coating layer 142 is bonded to itself.

Two ends of the shield layer with adhesive 140 forming the third bonding section 150 are bonded on the side of the −Y side end of the resin insulating layer 130, and the third bonding section 150 is bent along the −Y side edge of the resin insulating layer 130. An end 153 of the third bonding section 150 is positioned to overlap the resin insulating layer 130 in the Z-axis direction. That is, the third bonding section 150 has a first portion 151 extending in the Z-axis direction from the side of the −Y side end of the resin insulating layer 130 and a second portion 152 connected to the first portion 151 and extending in the Y-axis direction toward the +Y side end of the resin insulating layer 130. The Z-axis direction is an example of a first direction.

The shielded flat cable 100 includes a pair of flame-retardant resin films 160 that cover the outer surface of the shield layer with adhesive 140. The pair of resin films 160 include a base material layer 161, a flame-retardant insulating layer 162, and an anchor coating layer 163. The base material layer 161 is a layer for securing the dielectric strength of the shielded flat cable 100 and is made of, for example, polyethylene terephthalate. The flame-retardant insulating layer 162 is a layer for bonding the resin insulating layer 130 or the shield layer 141 to the base material layer 161 while securing the flame retardancy, pressure resistance, and deterioration resistance of the shielded flat cable 100, and is made of, for example, a thermoplastic resin material. As the flame-retardant insulating layer 162, for example, a thermoplastic polyester resin containing a phosphorus-based flame retardant or a nitrogen-based flame retardant can be used. The anchor coating layer 163 for bonding the base material layer 161 to the flame-retardant insulating layer 162 is provided between the base material layer 161 and the flame-retardant insulating layer 162. The material of the anchor coating layer 163 is not limited. For example, as the material of the anchor coating layer 163, it is preferable to use the same material as that of the anchor coating layer 142. The anchor coating layer 163 may be flame-retardant.

In the Y-axis direction, the dimension of the resin film 160 is larger than the dimension of the resin insulating layer 130 and the dimension of the shield layer with adhesive 140. In the Y-axis direction, the ends on both sides of the resin film 160 extend outward from the ends on both sides of the resin insulating layer 130 and the shield layer with adhesive 140. The pair of resin films 160 have a first bonding section 11 in which the −Y side end of one resin film 160 is bonded to the −Y side end of the other resin film 160, and a second bonding section 12 in which the +Y side end of one resin film 160 is bonded to the +Y side end of the other resin film 160. That is, the pair of the resin films 160 have the first bonding section 11 and the second bonding section 12 in which the pair of the resin films 160 are bonded to each other. For example, in the Y-axis direction, the shield layer 141 is arranged between the first bonding section 11 and the second bonding section 12. In the first bonding section 11 and the second bonding section 12, the base material layers 161 of the pair of the resin films 160 are bonded to each other through the flame-retardant insulating layer 162 and the anchor coating layer 163. The entire surface of both ends of the resin insulating layer 130 and the shield layer with adhesive 140 is covered with the pair of the resin films 160.

The outer peripheral surface of the shield layer 141 has a first portion 21 that contacts the first bonding section 11 and a second portion 22 that contacts the second bonding section 12. For example, the pair of the resin films 160 are bonded on the first portion 21 and the second portion 22. Additionally, the end 153 of the third bonding section 150 is separated from the first bonding section 11 and the second bonding section 12.

In the shielded flat cable 100, the flame-retardant insulating layer 162 and the shield layer 141 protect the resin insulating layer 130 against flames approaching in the Z-axis direction. Additionally, there is a risk that flames approaching the end in the width direction (the Y-axis direction) may enter the first bonding section 11 or the second bonding section 12, but the first portion 21 is in contact with the first bonding section 11 and the second portion 22 is in contact with the second bonding section 12, so that the sealed state of the shield layer 141 is maintained. Thus, the resin insulating layer 130 is protected by the shield layer 141 and flames can be quickly extinguished. Therefore, excellent flame retardancy can be obtained and excellent results can be obtained in flame tests such as VW-1 tests.

Better flame retardancy is obtained because the end 153 of the third bonding section 150 is separated from the first bonding section 11 and the second bonding section 12.

The third bonding section 150 has a first portion 151 and a second portion 152. That is, the third bonding section 150 is bent along the outer shape of the resin insulating layer 130. Furthermore, the end 153 is positioned to overlap the resin insulating layer 130 in the Z-axis direction. Therefore, the third bonding section 150 is not easily opened, and better flame retardancy can be obtained.

In manufacturing the shielded flat cable 100, for example, the shield layer with adhesive 140 is arranged to surround the resin insulating layer 130, and the anchor coating layer 142 is bonded at its two ends to form the third bonding section 150. Additionally, it is easy to bend the third bonding section 150 to include the first portion 151 and the second portion 152. Therefore, a shielded flat cable 100 with excellent flame retardancy can be easily manufactured.

Additionally, because the shield layer 141 is arranged between the first bonding section 11 and the second bonding section 12 in the Y-axis direction, it is easy to arrange the pair of the resin films 160 to cover the outer surface of the shield layer 141.

Second Embodiment

Figure 2:
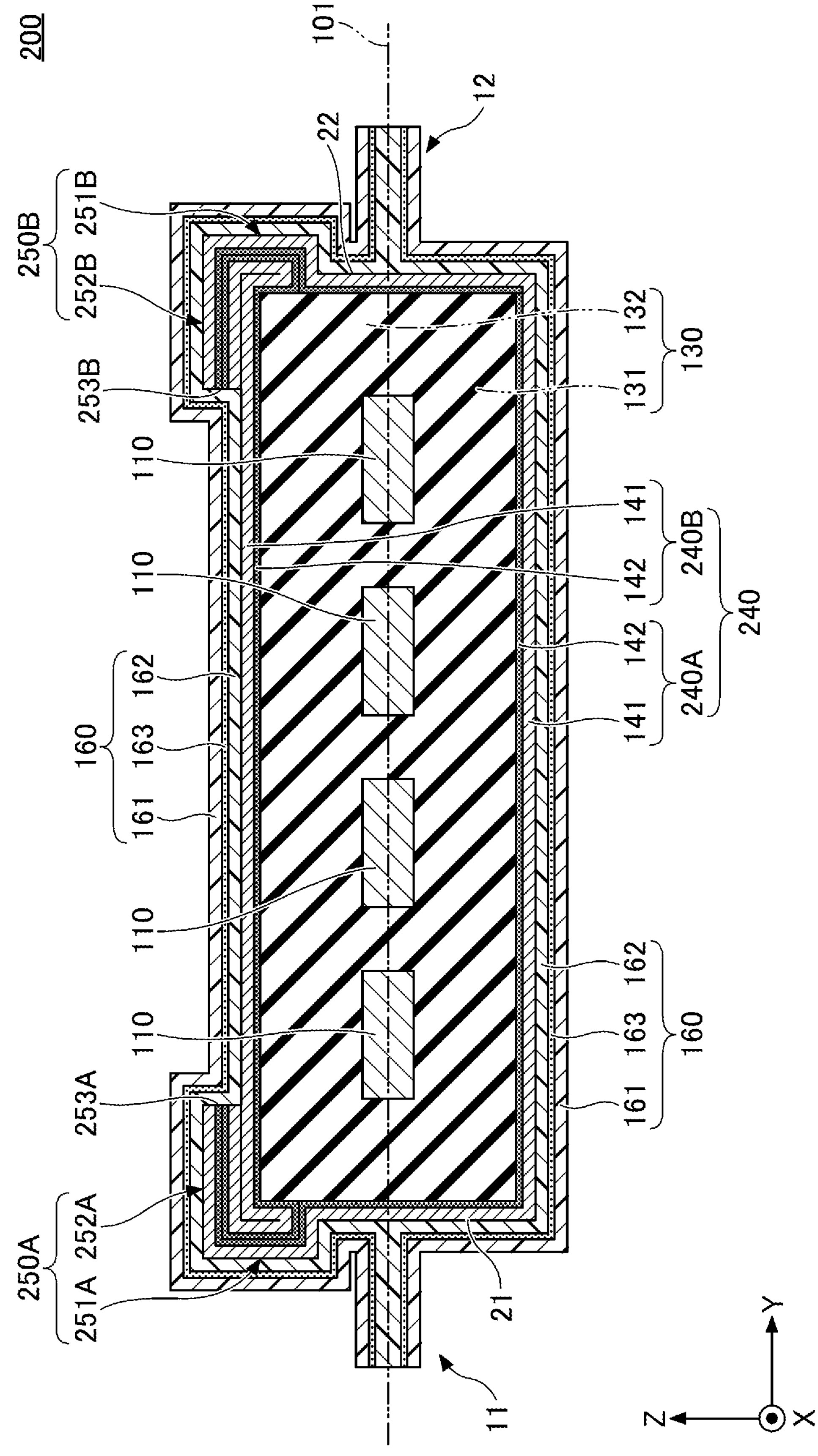
FIG. 2 is a cross-sectional view illustrating a shielded flat cable according to a second embodiment.

A second embodiment will be described. FIG. 2 is a cross-sectional view illustrating a shielded flat cable according to the second embodiment. The second embodiment differs from the first embodiment mainly in the configuration of the shield layer with adhesive.

As illustrated in FIG. 2, a shielded flat cable 200 according to the second embodiment includes a shield layer with adhesive 240 instead of the shield layer with adhesive 140. The shield layer with adhesive 240 includes a first shield layer with adhesive 240A and a second shield layer with adhesive 240B. Each of the first shield layer with adhesive 240A and the second shield layer with adhesive 240B includes the shield layer 141 and the anchor coating layer 142, as in the shield layer with adhesive 140. In the Y-axis direction, the dimension of each of the first shield layer with adhesive 240A and the second shield layer with adhesive 240B is larger than the dimension of the resin insulating layer 130.

The first shield layer with adhesive 240A covers the −Z side outer surface of the first resin insulating layer 131, and the second shield layer with adhesive 240B covers the +Z side outer surface of the second resin insulating layer 132. The shield layer with adhesive 240 has a third bonding section 250A where the anchor coating layers 142 at the −Y side end of the first shield layer with adhesive 240A and at the −Y side end of the second shield layer with adhesive 240B are bonded together. The shield layer with adhesive 240 has a third bonding section 250B where the anchor coating layers 142 at the +Y side end of the first shield layer with adhesive 240A and the anchor coating layers 142 at the +Y side end of the second shield layer with adhesive 240B are bonded together.

The third bonding section 250A is bent along the −Y side edge of the resin insulating layer 130. An end 253A of the third bonding section 250A is positioned to overlap the resin insulating layer 130 in the Z-axis direction. That is, the third bonding section 250A has a first portion 251A extending in the Z-axis direction from the side of the −Y side end of the resin insulating layer 130 and a second portion 252A connected to the first portion 251A and extending in the Y-axis direction toward the +Y side end of the resin insulating layer 130.

The third bonding section 250B is bent along the +Y side edge of the resin insulating layer 130. An end 253B of the third bonding section 250B is positioned to overlap the resin insulating layer 130 in the Z-axis direction. That is, the third bonding section 250B has a first portion 251B extending in the Z-axis direction from the side of the +Y side end of the resin insulating layer 130 and a second portion 252B connected to the first portion 251B and extending in the Y-axis direction toward the −Y side end of the resin insulating layer 130.

As in the first embodiment, the outer surface of the shield layer 141 has the first portion 21 that contacts the first bonding section 11 and the second portion 22 that contacts the second bonding section 12. For example, the pair of the resin films 160 are bonded on the first portion 21 and the second portion 22. Additionally, the end 253A of the third bonding section 250A and the end 253B of the third bonding section 250B are separated from the first bonding section 11 and the second bonding section 12.

The other configurations are substantially the same as those of the first embodiment.

Excellent flame retardancy can also be obtained by the shielded flat cable 200 according to the second embodiment.

In manufacturing the shielded flat cable 200, for example, the first shield layer with adhesive 240A and the second shield layer with adhesive 240B are arranged such that the resin insulating layer 130 is sandwiched between them in the Z-axis direction, and the anchor coating layers 142 are bonded at their ends to form the third bonding sections 250A and 250B. Additionally, it is easy to bend the third bonding section 250A to include the first portion 251A and the second portion 252A, and to bend the third bonding section 250B to include the first portion 251B and the second portion 252B. Therefore, it is particularly easy to process the first shield layer with adhesive 240A and the second shield layer with adhesive 240B, and a shielded flat cable 200 with excellent flame retardancy can be easily manufactured.

Third Embodiment

Figure 3:
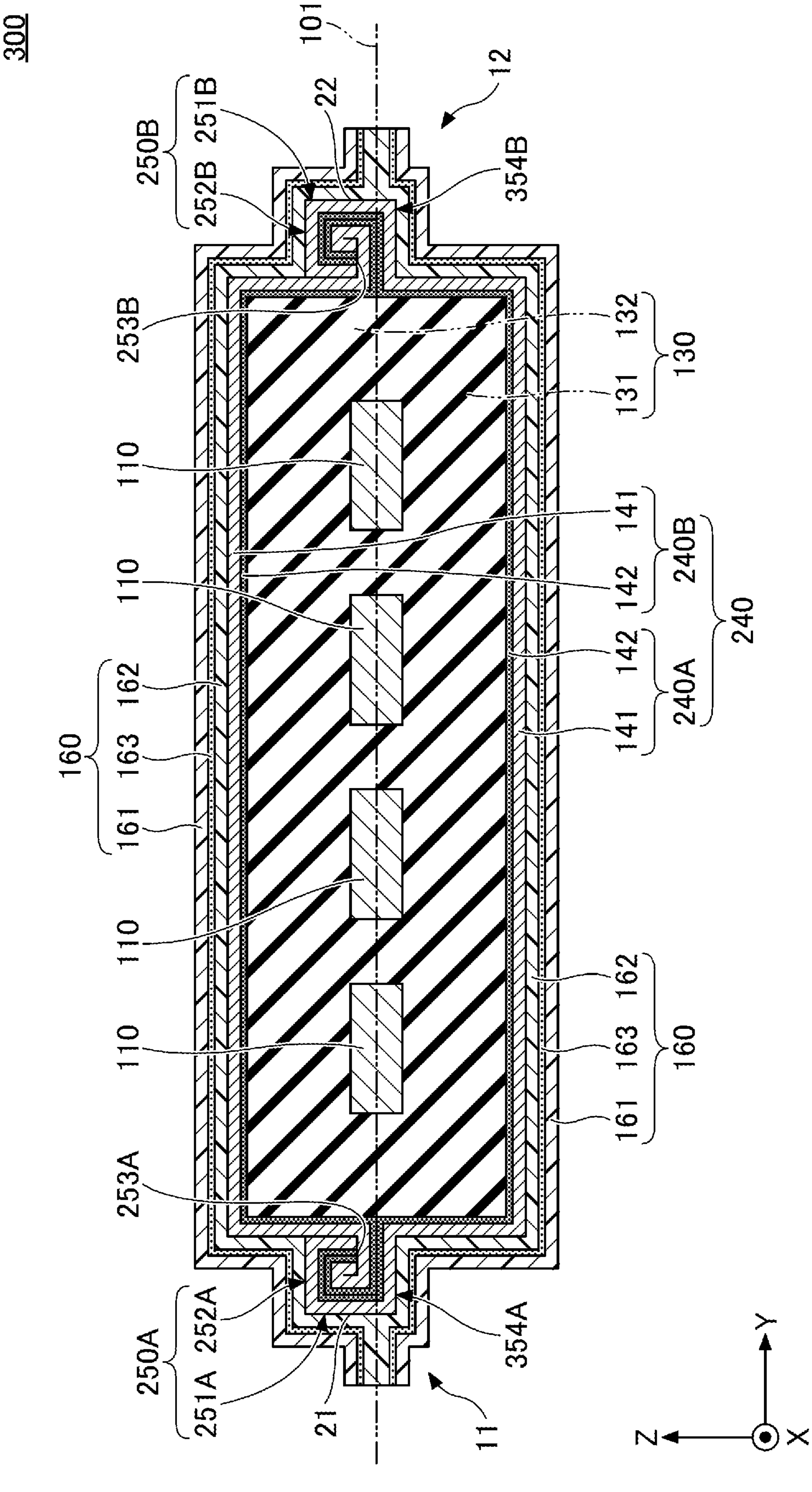
FIG. 3 is a cross-sectional view illustrating a shielded flat cable according to a third embodiment.

The third embodiment will be described. FIG. 3 is a cross-sectional view illustrating a shielded flat cable according to a third embodiment. The third embodiment differs from the first embodiment and other embodiments mainly in the configuration of the shield layer with adhesive.

As illustrated in FIG. 3, a shielded flat cable 300 according to the third embodiment includes the shield layer with adhesive 240, and the shield layer with adhesive 240 has the third bonding sections 250A and 250B, as in the second embodiment.

The third bonding section 250A includes a multi-folded section 354A provided between the resin insulating layer 130 and the first bonding section 11 in the Y-axis direction. The multi-folded section 354A has the first portion 251A extending in the Z-axis direction and the second portion 252A connected to the first portion 251A and extending in the Y-axis direction toward the +Y side end of the resin insulating layer 130.

The third bonding section 250B includes a multi-folded section 354B provided between the resin insulating layer 130 and the second bonding section 12 in the Y-axis direction. The multi-folded section 354B has the first portion 251B extending in the Z-axis direction and the second portion 252B connected to the first portion 251B and extending in the Y-axis direction toward the −Y side end of the resin insulating layer 130.

As in the first embodiment, the outer surface of the shield layer 141 has the first portion 21 that contacts the first bonding section 11 and the second portion 22 that contacts the second bonding section 12. For example, the pair of the resin films 160 are bonded on the first portion 21 and the second portion 22. Additionally, the end 253A of the third bonding section 250A is provided inside the multi-folded section 354A and is separated from the first bonding section 11 and the second bonding section 12. The end 253B of the third bonding section 250B is provided inside the multi-folded section 354B and is separated from the first bonding section 11 and the second bonding section 12.

The other configurations are substantially the same as those of the second embodiment.

Excellent flame retardancy can also be obtained by the shielded flat cable 300 according to the third embodiment. Particularly, the third bonding sections 250A and 250B are not easily opened, so that better flame retardancy can be obtained.

In manufacturing the shielded flat cable 300, for example, the first shield layer with adhesive 240A and the second shield layer with adhesive 240B are arranged such that the resin insulating layer 130 is sandwiched between them in the Z-axis direction, and the anchor coating layers 142 are bonded at their ends to form the third bonding sections 250A and 250B. Additionally, it is easy to bend the third bonding section 250A to include the multi-folded section 354A and to bend the third bonding section 250B to include the multi-folded section 354B. Therefore, a shielded flat cable 300 with excellent flame retardancy can be easily manufactured.

Here, as in the first embodiment, the single shield layer with adhesive 140 may be used to form the third bonding section 150, and the multi-folded section may be formed by folding the third bonding section 150 multiple times.

Fourth Embodiment

Figure 4:
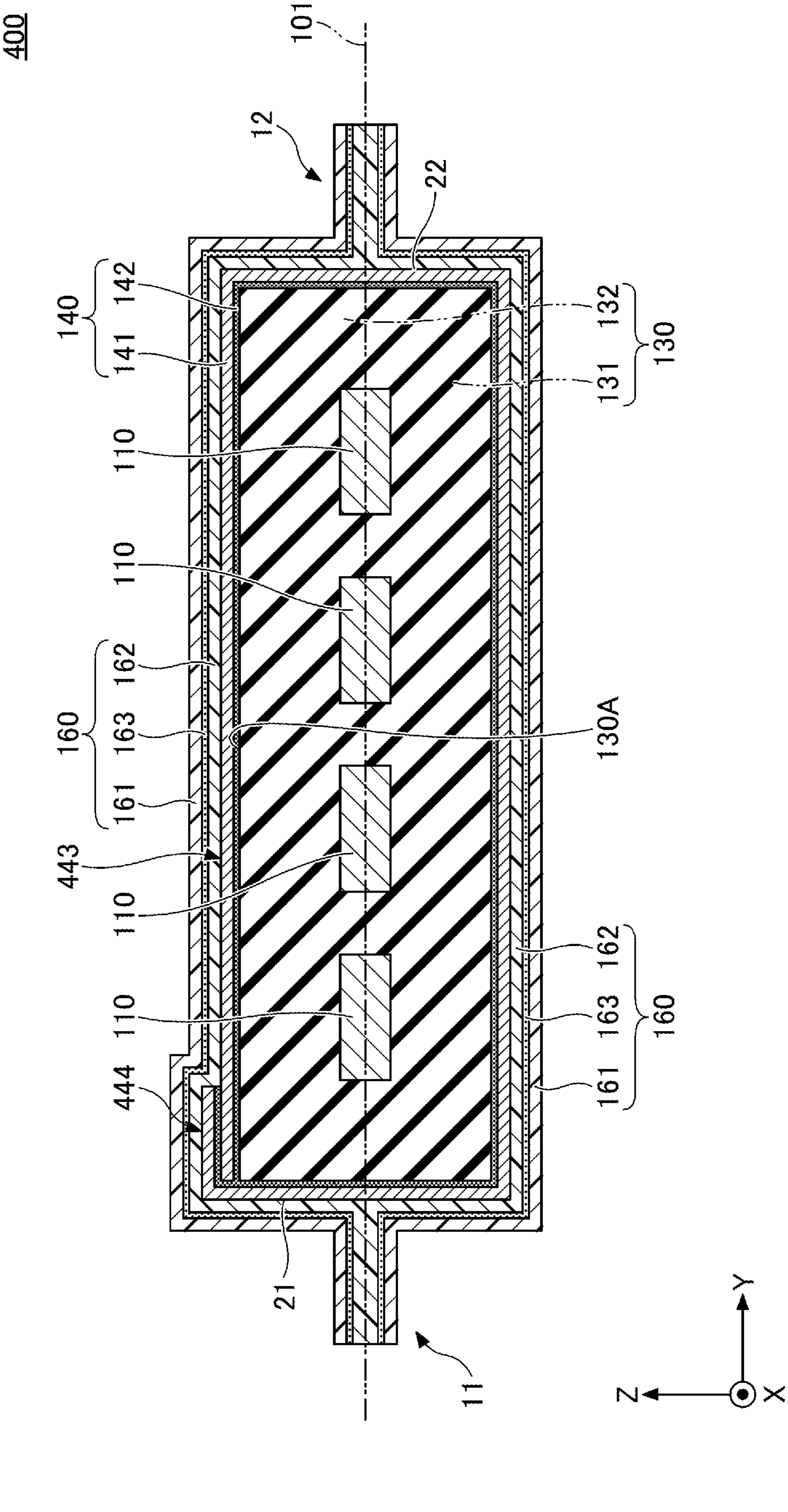
FIG. 4 is a cross-sectional view illustrating a shielded flat cable according to a fourth embodiment.

A fourth embodiment will be described. FIG. 4 is a cross-sectional view illustrating a shielded flat cable according to the fourth embodiment. The fourth embodiment differs from the first embodiment and other embodiments mainly in the configuration of the shield layer with adhesive.

As illustrated in FIG. 4, in a shielded flat cable 400 according to the fourth embodiment, as in the first embodiment, the shield layer with adhesive 140 continuously surrounds the outer surface of the resin insulating layer 130. In the fourth embodiment, the shield layer with adhesive 140 includes a third portion 443 and a fourth portion 444. The third portion 443 covers one surface 130A of the resin insulating layer 130 that is parallel to the first plane 101 and reaches the first portion 21. That is, the third portion 443 reaches the end of the resin insulating layer 130 on the first bonding section 11 side in the Y-axis direction (the −Y side end). The fourth portion 444 covers the surface 130A of the resin insulating layer 130 from above the third portion 443 in the vicinity of the end on the first bonding section 11 side (the −Y side end). The anchor coating layer 142 of the fourth portion 444 is provided between the shield layer 141 of the third portion 443 and the shield layer 141 of the fourth portion 444 to bond the shield layer 141 of the third portion 443 and the shield layer 141 of the fourth portion 444.

As in the first embodiment, the outer surface of the shield layer 141 has the first portion 21 that contacts the first bonding section 11 and the second portion 22 that contacts the second bonding section 12. For example, the pair of the resin films 160 are bonded on the first portion 21 and the second portion 22.

The other configurations are substantially the same as those of the first embodiment.

Excellent flame retardancy can also be obtained by the shielded flat cable 400 according to the fourth embodiment.

In manufacturing the shielded flat cable 400, for example, the shield layer with adhesive 140 is arranged such that one end reaches the −Y side end of the resin insulating layer 130, and the other end overlaps the shield layer with adhesive 140 by surrounding the outer periphery of the resin insulating layer 130. Therefore, a shielded flat cable 400 with excellent flame retardancy can be easily manufactured.

Fifth Embodiment

Figure 5:
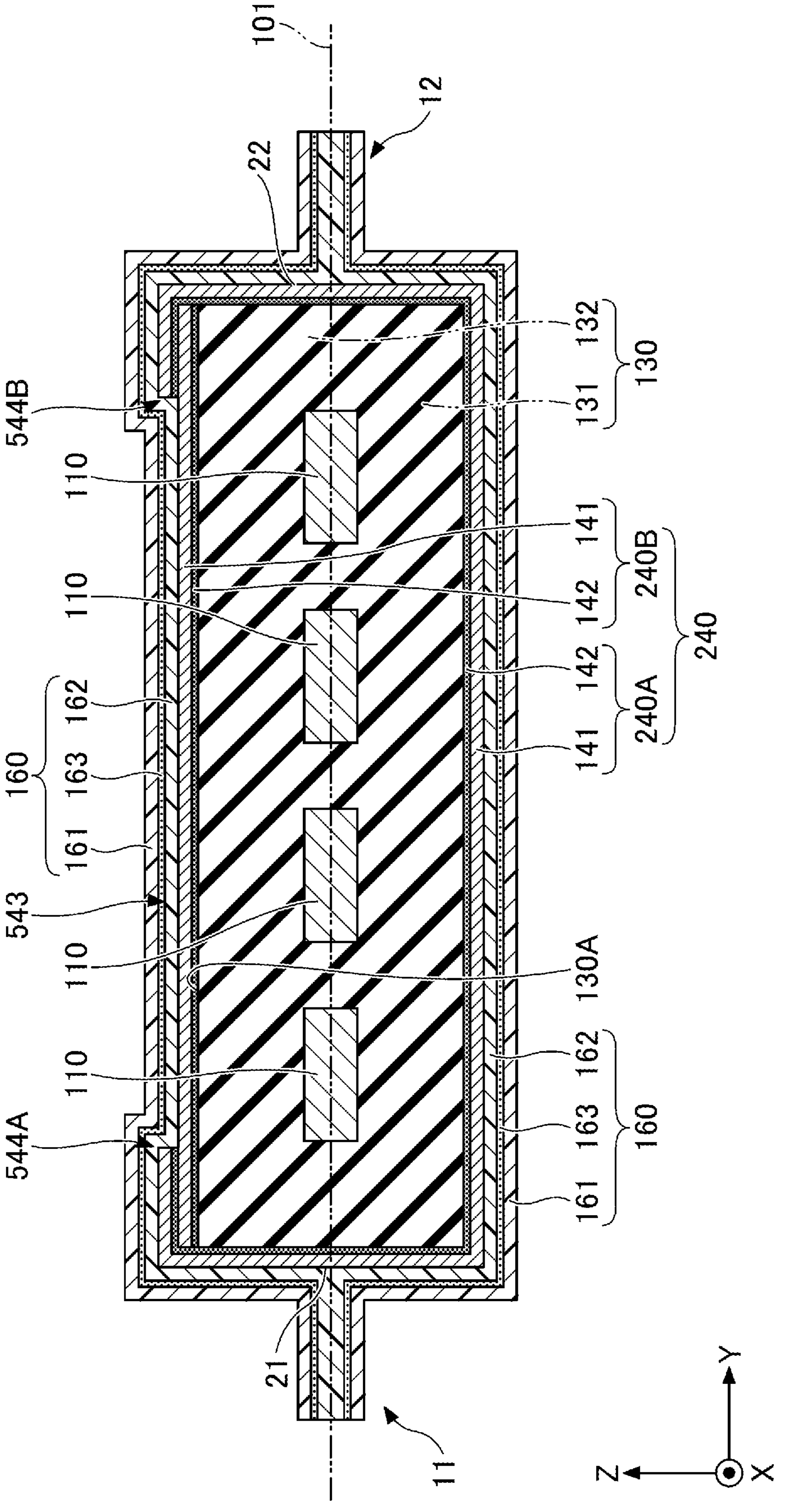
FIG. 5 is a cross-sectional view illustrating a shielded flat cable according to a fifth embodiment.

A fifth embodiment will be described. FIG. 5 is a cross-sectional view illustrating a shielded flat cable according to the fifth embodiment. The fifth embodiment differs from the first embodiment and other embodiments mainly in the configuration of the shield layer with adhesive.

As illustrated in FIG. 5, a shielded flat cable 500 according to the fifth embodiment includes the shield layer with adhesive 240 instead of the shield layer with adhesive 140. The shield layer with adhesive 240 includes the first shield layer with adhesive 240A and the second shield layer with adhesive 240B. In the Y-axis direction, the dimension of the first shield layer with adhesive 240A is larger than the dimension of the resin insulating layer 130, and the dimension of the second shield layer with adhesive 240B is substantially equal to the dimension of the resin insulating layer 130.

The first shield layer with adhesive 240A covers the outer surface of the first resin insulating layer 131 on the −Z side, and the second shield layer with adhesive 240B covers the outer surface of the second resin insulating layer 132 on the +Z side. In the fifth embodiment, the second shield layer with adhesive 240B includes a third portion 543, and the first shield layer with adhesive 240A includes fourth portions 544A and 544B. The third portion 543 covers one surface 130A of the resin insulating layer 130 that is parallel to the first plane 101 and reaches both the first portion 21 and the second portion 22. That is, the third portion 543 reaches both the end of the resin insulating layer 130 on the first bonding section 11 side in the Y-axis direction (the −Y side end) and the end of the resin insulating layer 130 on the second bonding section 12 side in the Y-axis direction (the +Y side end). The fourth portion 544A covers the surface 130A of the resin insulating layer 130 from above the third portion 543 in the vicinity of the end on the first bonding section 11 side (the −Y side end). The fourth portion 544B covers the surface 130A of the resin insulating layer 130 from above the third portion 543 in the vicinity of the end on the second bonding section 12 side (the +Y side end). The anchor coating layers 142 of the fourth portions 544A and 544B are provided between the shield layer 141 of the third portion 543 and the shield layers 141 of the fourth portions 544A and 544B to bond shield layer 141 of the third portion 543 and the shield layers 141 of the fourth portions 544A and 544B.

As in the fourth embodiment, the outer surface of the shield layer 141 has the first portion 21 that contacts the first bonding section 11 and the second portion 22 that contacts the second bonding section 12. For example, the pair of the resin films 160 are bonded on the first portion 21 and the second portion 22.

The other configurations are substantially the same as those of the fourth embodiment.

Excellent flame retardancy can also be obtained by the shielded flat cable 500 according to the fifth embodiment.

In manufacturing the shielded flat cable 500, for example, the first shield layer with adhesive 240A and the second shield layer with adhesive 240B are arranged such that the resin insulating layer 130 is sandwiched between them in the Z-axis direction. At this time, the second shield layer with adhesive 240B is arranged such that one end reaches the first portion 21 and the other end reaches the second portion 22. That is, the second shield layer with adhesive 240B is arranged such that one end reaches the −Y side end of the resin insulating layer 130 and the other end reaches the +Y side end of the resin insulating layer 130. Additionally, the first shield layer with adhesive 240A is arranged such that both ends overlap the second shield layer with adhesive 240B. Therefore, it is particularly easy to process the first shield layer with adhesive 240A and the second shield layer with adhesive 240B, and a shielded flat cable 500 with excellent flame retardancy can be easily manufactured.

Sixth Embodiment

Figure 6:
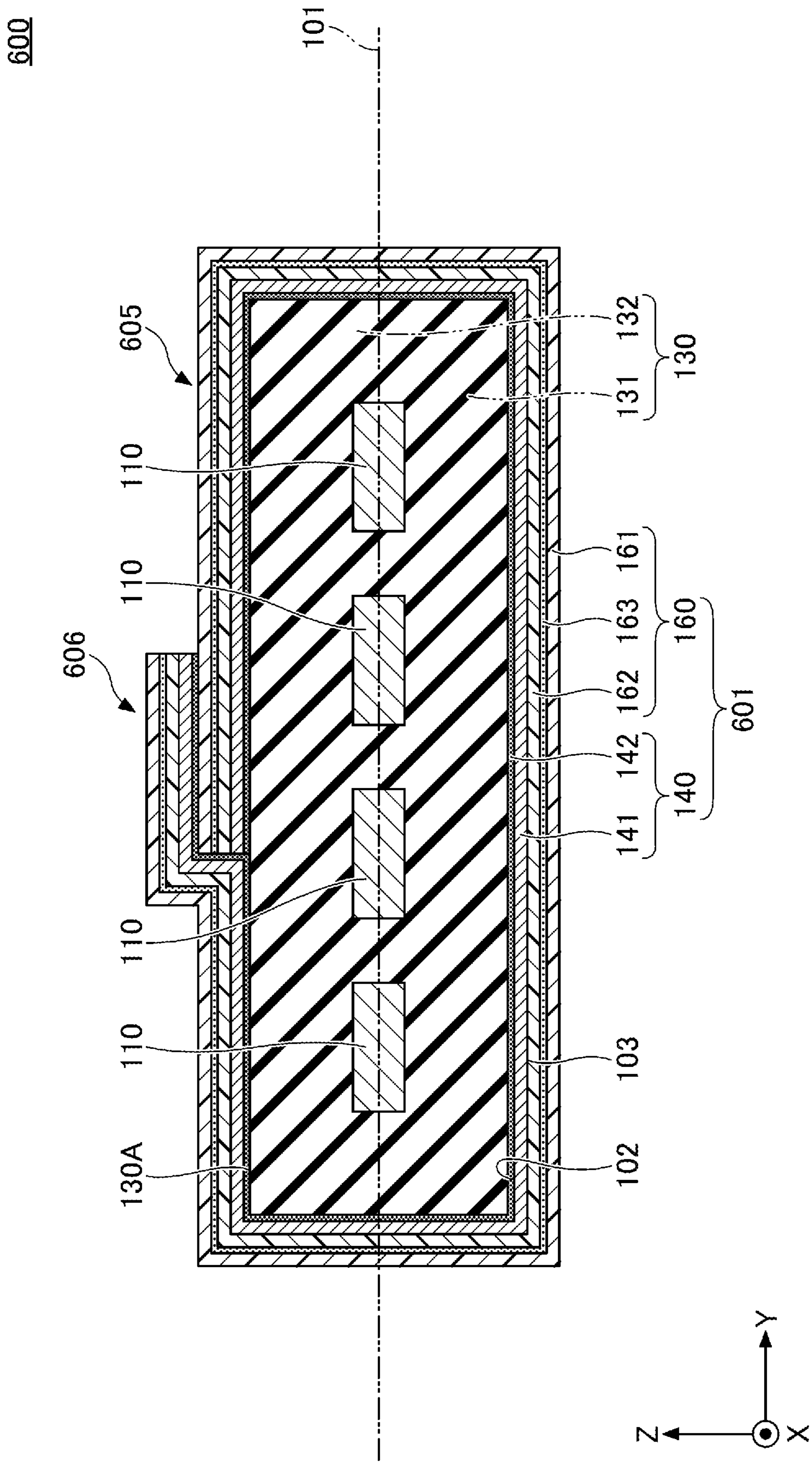
FIG. 6 is a cross-sectional view illustrating a shielded flat cable according to a sixth embodiment.

A sixth embodiment will be described. FIG. 6 is a cross-sectional view illustrating a shielded flat cable according to the sixth embodiment. The sixth embodiment differs from the first embodiment and other embodiments in that the shield layer with adhesive and resin film is mainly used.

As illustrated in FIG. 6, as in the first embodiment, a shielded flat cable 600 according to the sixth embodiment includes multiple conductors 110 and the resin insulating layer 130. The shielded flat cable 600 includes a shield layer with adhesive and resin film 601 that covers the outer surface of the resin insulating layer 130. The shield layer with adhesive and resin film 601 includes the shield layer with adhesive 140 and the resin film 160. The shield layer with adhesive 140 includes the shield layer 141 and the anchor coating layer 142, as in the first embodiment, and the resin film 160 includes the base material layer 161, the flame-retardant insulating layer 162, and the anchor coating layer 163, as in the first embodiment. The shield layer 141 has a second plane 102 and a third plane 103 opposite to the second plane 102, the anchor coating layer 142 is provided on the second plane 102, and the resin film 160 is provided on the third plane 103. For example, the shield layer with adhesive 140 and the resin film 160 are integrated. The anchor coating layer 142 is disposed closer to the resin insulating layer 130 than the resin film 160 is.

The shield layer with adhesive and resin film 601 continuously surrounds the outer surface of the resin insulating layer 130. The shield layer with adhesive and resin film 601 has a fifth portion 605 and a sixth portion 606. The fifth portion 605 covers at least a portion of one surface 130A of the resin insulating layer 130 that is parallel to the first plane 101. The fifth portion 605 may be separated from both ends of the resin insulating layer 130 in the Y-axis direction. The sixth portion 606 covers the surface 130A of the resin insulating layer 130 from above the fifth portion 605. The anchor coating layer 142 of the sixth portion 606 is provided between the base material layer 161 of the fifth portion 605 and the shield layer 141 of the sixth portion 606 to bond the base material layer 161 of the fifth portion 605 to the shield layer 141 of the sixth portion 606.

In the shielded flat cable 600, the flame-retardant insulating layer 162 and the shield layer 141 protect the resin insulating layer 130. Additionally, because the shield layer with adhesive and resin film 601 is used and the resin films 160 are not bonded to each other, flames do not easily enter the inside of the shield layer with adhesive and resin film 601. Therefore, excellent flame retardancy can be obtained and excellent results can be obtained in flame tests such as VW-1 tests.

In manufacturing the shielded flat cable 600, for example, the shield layer with adhesive and resin film 601 is disposed such that the outer circumference of the resin insulating layer 130 is surrounded and the two ends overlap over the surface 130A. Therefore, a shielded flat cable 600 with excellent flame retardancy can be easily manufactured.

Seventh Embodiment

Figure 7:
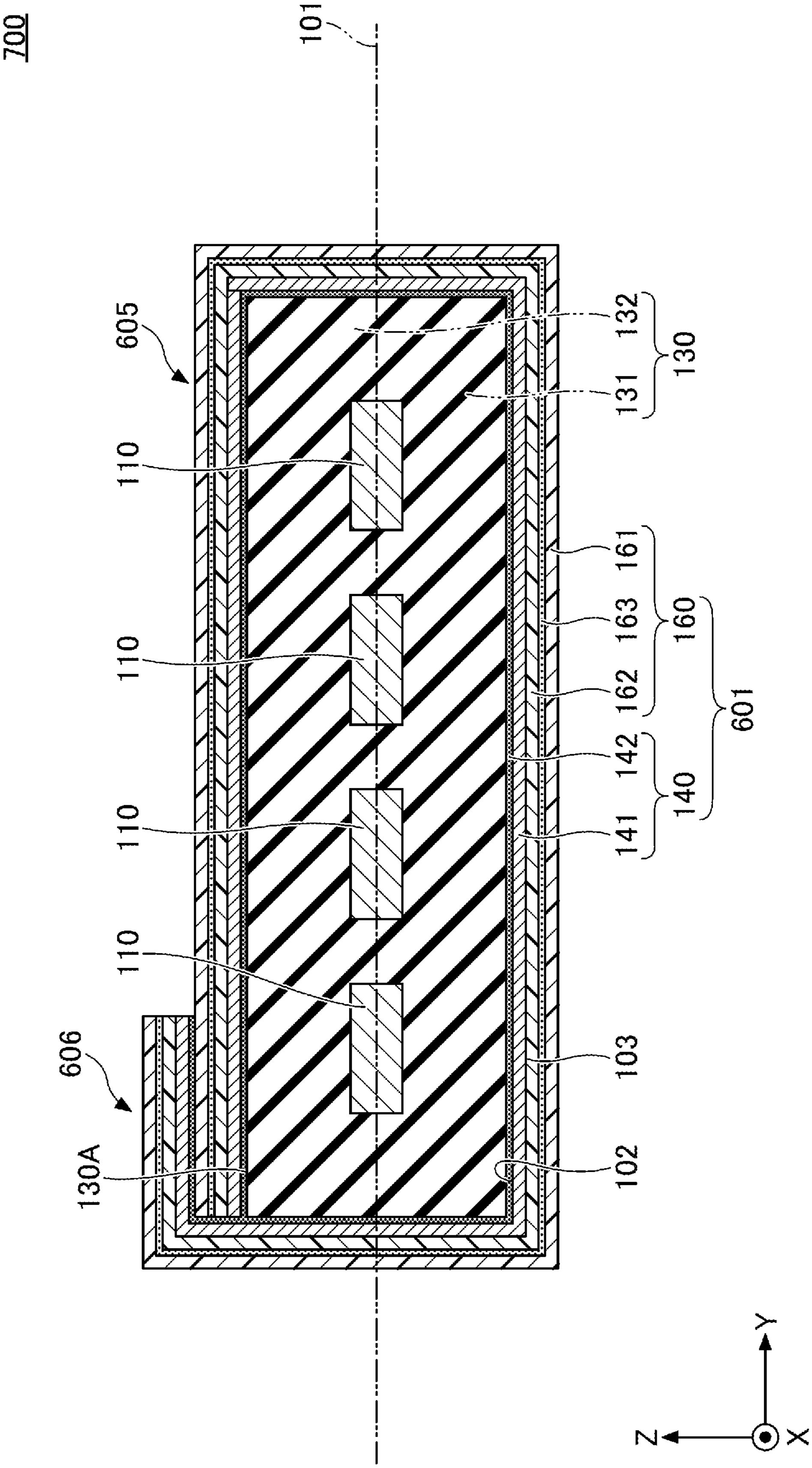
FIG. 7 is a cross-sectional view illustrating a shielded flat cable according to a seventh embodiment.

A seventh embodiment will be described. FIG. 7 is a cross-sectional view illustrating a shielded flat cable according to the seventh embodiment. The seventh embodiment differs from the sixth embodiment and others mainly in the arrangement of the fifth and sixth portions.

As illustrated in FIG. 7, in a shielded flat cable 700 according to the seventh embodiment, as in the sixth embodiment, the shield layer with adhesive and resin film 601 continuously surrounds the outer surface of the resin insulating layer 130. Here, the fifth portion 605 reaches one end of the resin insulating layer 130 in the Y-axis direction (the −Y side end). The sixth portion 606 covers the surface 130A of the resin insulating layer 130 from above the fifth portion 605 in the vicinity of the −Y side end. As in the sixth embodiment, the anchor coating layer 142 of the sixth portion 606 is provided between the base material layer 161 of the fifth portion 605 and the shield layer 141 of the sixth portion 606 to bond the base material layer 161 of the fifth portion 605 to the shield layer 141 of the sixth portion 606.

The other configurations are substantially the same as those of the sixth embodiment.

Excellent flame retardancy can also be obtained by the shielded flat cable 700 according to the seventh embodiment.

In manufacturing the shielded flat cable 700, for example, the shield layer with adhesive and resin film 601 is arranged such that one end reaches the −Y side end of the resin insulating layer 130 and the other end overlaps the shield layer with adhesive and resin film 601 by surrounding the outer periphery of the resin insulating layer 130. Therefore, particularly, it is easy to process the shield layer with adhesive and resin film 601, and a shielded flat cable 700 with excellent flame retardancy can be easily manufactured.

Eighth Embodiment

Figure 8:
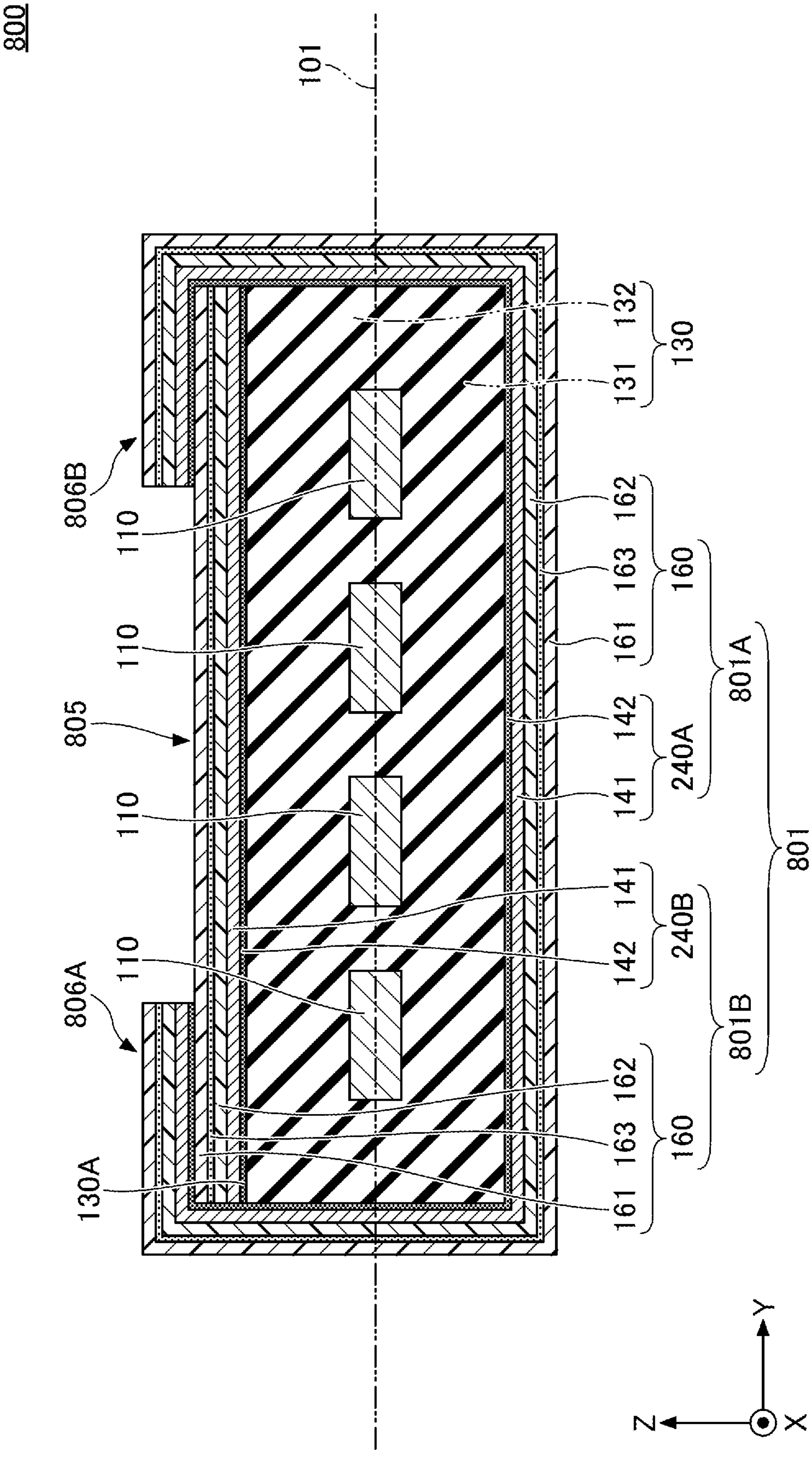
FIG. 8 is a cross-sectional view illustrating a shielded flat cable according to an eighth embodiment.

An eighth embodiment will be described. FIG. 8 is a cross-sectional view illustrating a shielded flat cable according to the eighth embodiment. The eighth embodiment differs from the sixth and other embodiments mainly in the configuration of the shield layer with adhesive and resin film.

As illustrated in FIG. 8, a shielded flat cable 800 according to the eighth embodiment has a shield layer with adhesive and resin film 801 instead of the shield layer with adhesive and resin film 601. The shield layer with adhesive and resin film 801 includes a first shield layer with adhesive and resin film 801A and a second shield layer with adhesive and resin film 801B. In the Y-axis direction, the dimension of the first shield layer with adhesive and resin film 801A is larger than the dimension of the resin insulating layer 130, and the dimension of the second shield layer with adhesive and resin film 801B is substantially equal to the dimension of the resin insulating layer 130.

The first shield layer with adhesive and resin film 801A covers the outer surface of the first resin insulating layer 131 on the −Z side, and the second shield layer with adhesive and resin film 801B covers the outer surface of the second resin insulating layer 132 on the +Z side. In the eighth embodiment, the second shield layer with adhesive and resin film 801B includes a fifth portion 805, and the first shield layer with adhesive and resin film 801A includes sixth portions 806A and 806B. The fifth portion 805 covers one surface 130A of the resin insulating layer 130 that is parallel to the first plane 101 and reaches both the −Y side end and the +Y side end of the resin insulating layer 130 in the Y-axis direction. The sixth portion 806A covers the surface 130A of the resin insulating layer 130 from above the fifth portion 805 in the vicinity of the −Y side end. The sixth portion 806B covers the surface 130A of the resin insulating layer 130 from above the fifth portion 805 in the vicinity of the +Y side end. The anchor coating layers 142 of the sixth portions 806A and 806B are provided between the base material layer 161 of the fifth portion 805 and the shield layers 141 of the sixth portions 806A and 806B to bond the base material layer 161 of the fifth portion 805 to the shield layers 141 of the sixth portions 806A and 806B.

The other configurations are substantially the same as those of the sixth embodiment.

Excellent flame retardancy can also be obtained by the shielded flat cable 800 according to the eighth embodiment.

In manufacturing the shielded flat cable 800, for example, the first shield layer with adhesive and resin film 801A and the second shield layer with adhesive and resin film 801B are arranged such that the resin insulating layer 130 is sandwiched between them in the Z-axis direction. At this time, the second shield layer with adhesive and resin film 801B is arranged such that one end reaches the −Y side end of the resin insulating layer 130 and the other end reaches the +Y side end of the resin insulating layer 130. Additionally, the first shield layer with adhesive and resin film 801A is arranged such that both ends overlap the second shield layer with adhesive and resin film 8015. Therefore, particularly, it is easy to process the first shield layer with adhesive and resin film 801A and the second shield layer with adhesive and resin film 8015, and a shielded flat cable 800 with excellent flame retardancy can be easily manufactured.

Figure 9:
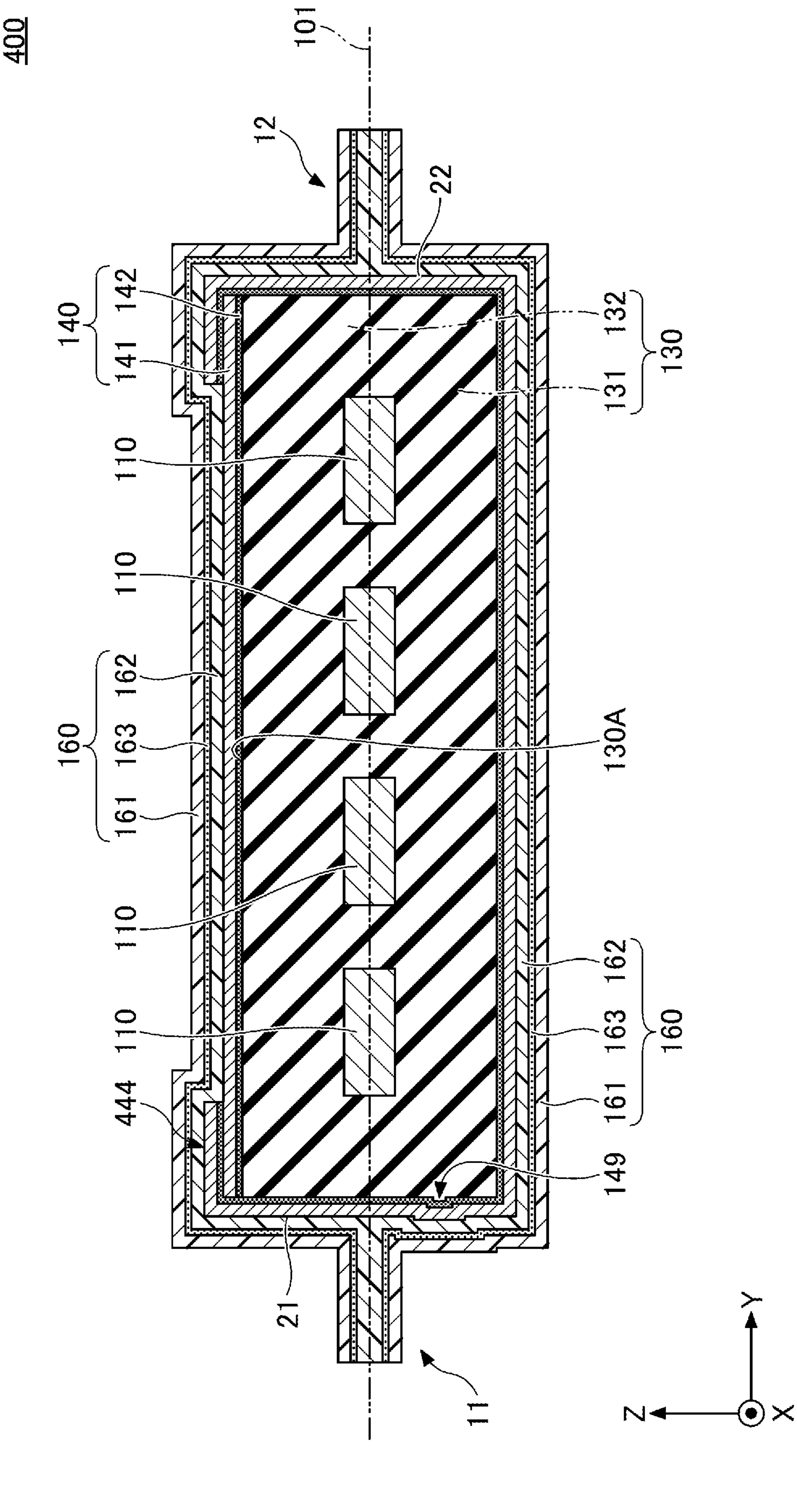
FIG. 9 is a cross-sectional view illustrating a shielded flat cable according to the fourth embodiment in which a cavity is formed.

Even if there is break or the like in the shield layer 141 or a cavity or the like due to non-bonding between the anchor coating layer 142 and the resin insulating layer 130, flames can be prevented from entering the resin insulating layer 130. For example, as illustrated in FIG. 9, in the shielded flat cable 400 according to the fourth embodiment, even if there is a cavity 149 due to non-bonding between the anchor coating layer 142 and the resin insulating layer 130, the resin insulating layer 130 can be protected from flames. FIG. 9 is a cross-sectional view illustrating the shielded flat cable according to the fourth embodiment in which the cavity is formed.

Although the embodiments have been described in detail, the embodiments are not limited to the specific embodiments, and various modifications and changes can be made within the scope of the claims.

DESCRIPTION OF THE REFERENCE NUMERALS

11: first bonding section
12: second bonding section
21: first portion
22: second portion
100: shielded flat cable
101: first plane
102: second plane
103: third plane
110: conductor
130: resin insulating layer
130A: surface
131: first resin insulating layer
132: second resin insulating layer
140: shield layer with adhesive
141: shield layer
142: anchor coating layer
149: cavity
150: third bonding section
151: first portion
152: second portion
153: end
160: resin film
161: base material layer
162: flame-retardant insulating layer
163: anchor coating layer
200: shielded flat cable
240: shield layer with adhesive
240A: first shield layer with adhesive
240B: second shield layer with adhesive
250A, 250B: third bonding section
251A, 251B: first portion
252A, 252B: second portion
253A, 253B: end
300: shielded flat cable
354A, 354B: multi-folded section
400: shielded flat cable
443: third portion
444: fourth portion
500: shielded flat cable
543: third portion
544A, 544B: fourth portion
600: shielded flat cable
601: shield layer with adhesive and resin film
605: fifth portion
606: sixth portion
700: shielded flat cable
800: shielded flat cable
801: shield layer with adhesive and resin film
801A: first shield layer with adhesive and resin film
801B: second shield layer with adhesive and resin film
805: fifth portion
806A, 806B: sixth portion

The invention claimed is:

1. A shielded flat cable comprising:

a plurality of conductors arrayed together in parallel along a first plane;

a resin insulating layer including a first resin insulating layer and a second insulating layer, the first plane being sandwiched between the first resin insulating layer and the second insulating layer, and the first resin insulating layer and the second insulating layer covering the plurality of conductors;

a shield layer that covers an outer surface of the resin insulating layer and that includes an adhesive; and a pair of flame-retardant resin films that cover an outer surface of the shield layer, wherein the pair of resin films have a first bonding section and a second bonding section, the first bonding section being disposed at a first end of the resin insulating layer, and the second bonding section being disposed at a second end of the resin insulating layer, wherein the pair of resin films are bonded in the first bonding section such that the pair of resin films are in contact with each other at a first interface, wherein the pair of resin films are bonded in the second bonding section such that the pair of resin films are in contact with each other at a second interface, wherein the outer surface of the shield layer has a first portion that contacts the first interface and a second portion that contacts the second interface, the first portion being perpendicular to the first interface, and the second portion being perpendicular to the second interface, wherein the shield layer has a third bonding section where the adhesive is bonded to each other at a third interface, and wherein the third interface is separate and distinct from the first interface and the second interface.

2. The shielded flat cable as claimed in claim 1, wherein an end of the third bonding section is separated from the first bonding section and the second bonding section.

3. The shielded flat cable as claimed in claim 1, wherein the third bonding section has a first portion and a second portion, the first portion extending in a first direction perpendicular to the first plane, and the second portion being connected to the first portion and extending toward another end of the resin insulating layer in a second direction in which the plurality of conductors are arrayed in parallel.

4. The shielded flat cable as claimed in claim 3, wherein an end of the third bonding section is positioned to overlap the resin insulating layer in the first direction.

5. The shielded flat cable as claimed in claim 1, wherein the third bonding section includes a multi-folded section at a side of one end of the resin insulating layer in a second direction in which the plurality of conductors are arrayed in parallel.

6. The shielded flat cable as claimed claim 1, wherein the shield layer is a pair of said shield layers that respectively cover upper and lower surfaces of the resin insulating layer, and the adhesive of one shield layer and the adhesive of another shield layer are bonded at the third bonding section.

7. The shielded flat cable as claimed claim 1, wherein the shield layer is disposed between the first bonding section and the second bonding section in a second direction in which the plurality of conductors are arrayed in parallel.

8. A shielded flat cable comprising:

a plurality of conductors arrayed together in parallel along a first plane;

a resin insulating layer including a first resin insulating layer and a second insulating layer, the first plane being sandwiched between the first resin insulating layer and the second insulating layer, and the first resin insulating layer and the second insulating layer covering the conductors;

a shield layer that covers an outer surface of the resin insulating layer and that includes an adhesive; and a pair of flame-retardant resin films that cover an outer surface of the shield layer, wherein the pair of resin films have a first bonding section and a second bonding section, the first bonding section being disposed at a first end of the resin insulating layer, and the second bonding section being disposed at a second end of the resin insulating layer, wherein the pair of resin films are bonded in the first bonding section such that the pair of resin films are in contact with each other at a first interface, wherein the pair of resin films are bonded in the second bonding section such that the pair of resin films are in contact with each other at a second interface, wherein the outer surface of the shield layer has a first portion that contacts the first interface and a second portion that contacts the second interface, the first portion being perpendicular to the first interface, and the second portion being perpendicular to the second interface, and wherein the shield layer has a third portion and a fourth portion, the third portion covering one surface of the resin insulating layer and reaching the first portion, the one surface of the resin insulating layer being parallel to the first plane, and the fourth portion covering the one surface of the resin insulating layer from above the third portion, the third portion being disposed between the fourth portion and the one surface of the resin insulating layer.

9. The shielded flat cable as claimed in claim 8, wherein the shield layer is a pair of said shield layers that respectively cover upper and lower surfaces of the resin insulating layer, and wherein the third portion is included in one layer of the pair of shield layers and the fourth portion is included in another layer of the pair of shield layers.

10. A shielded flat cable comprising:

a plurality of conductors arrayed together in parallel along a first plane;

a resin insulating layer including a first resin insulating layer and a second insulating layer, the first plane being sandwiched between the first resin insulating layer and the second insulating layer, and the first resin insulating layer and the second insulating layer covering the conductors;

a shield layer that covers an outer surface of the resin insulating layer and that includes an adhesive and a flame-retardant resin film; and wherein the shield layer has a second plane and a third plane opposite to the second plane, wherein the adhesive is provided on the second plane, wherein the resin film is provided on the third plane;

wherein the adhesive is disposed closer to the resin insulating layer than the resin film is, wherein the shield layer has a fifth portion and a sixth portion, the fifth portion covering at least a portion of one surface of the resin insulating layer that is parallel to the first plane, and the sixth portion covering the one surface of the resin insulating layer from above the fifth portion.

11. The shielded flat cable as claimed in claim 10, wherein the fifth portion reaches one end of the resin insulating film in a second direction in which the plurality of conductors are arrayed in parallel.

12. The shielded flat cable as claimed in claim 10, wherein the shield layer is a pair of said shield layers that respectively cover upper and lower surfaces of the resin insulating layer, and wherein the fifth portion is included in one layer of the pair of shield layers and the sixth portion is included in another layer of the pair of shield layers.

* * * * *